Jan. 5, 1926.  
C. F. COWDREY  
1,568,801  
BRAKE TESTING DEVICE FOR AUTOMOBILES  
Filed Dec. 15, 1923   3 Sheets-Sheet 1
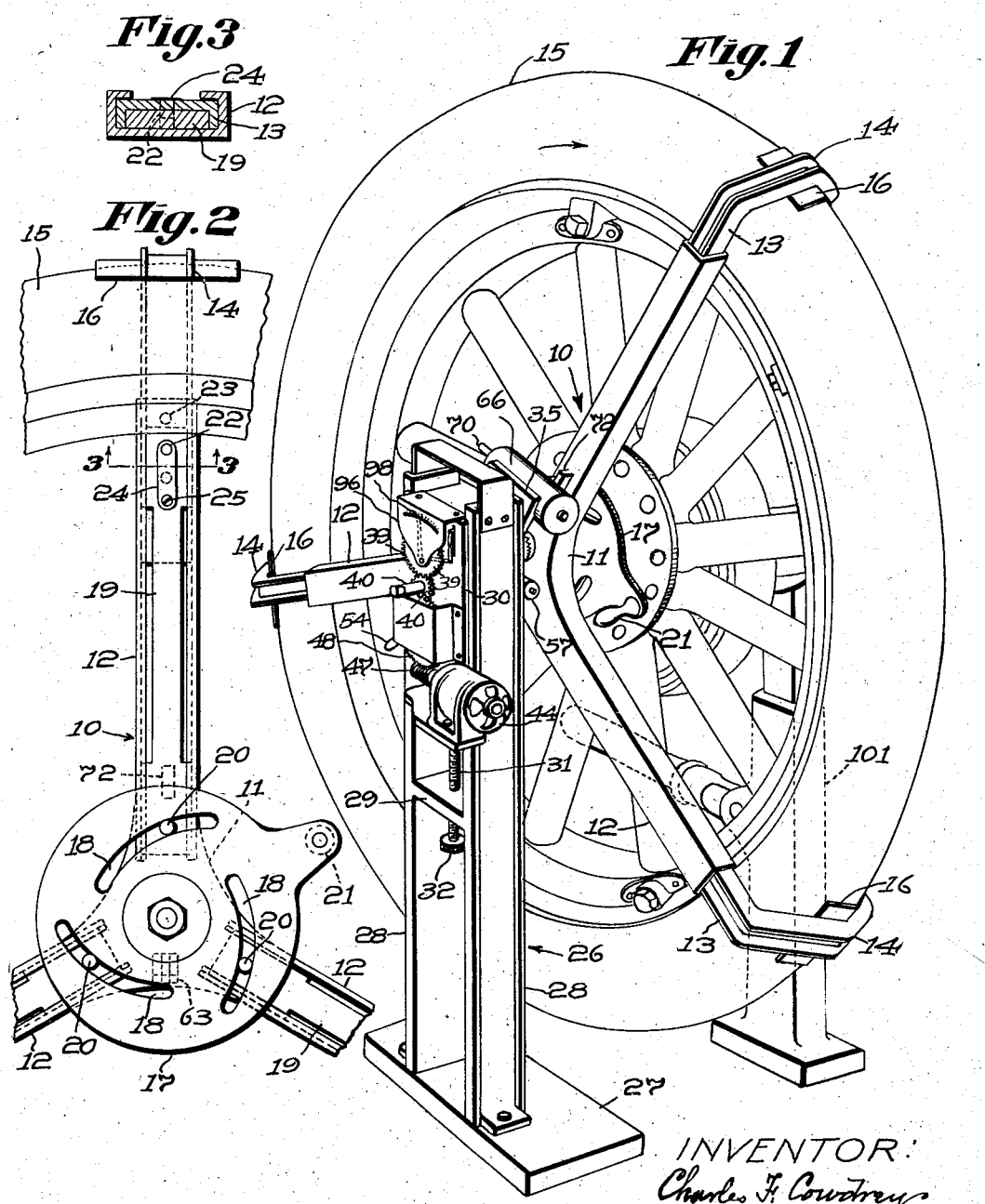
INVENTOR:  
Charles F. Cowdrey  
BY Robt. P. Hains  
ATTORNEY Jan. 5, 1926.  
C. F. COWDREY  
1,568,801  
BRAKE TESTING DEVICE FOR AUTOMOBILES  
Filed Dec. 15, 1923  
3 Sheets-Sheet 2
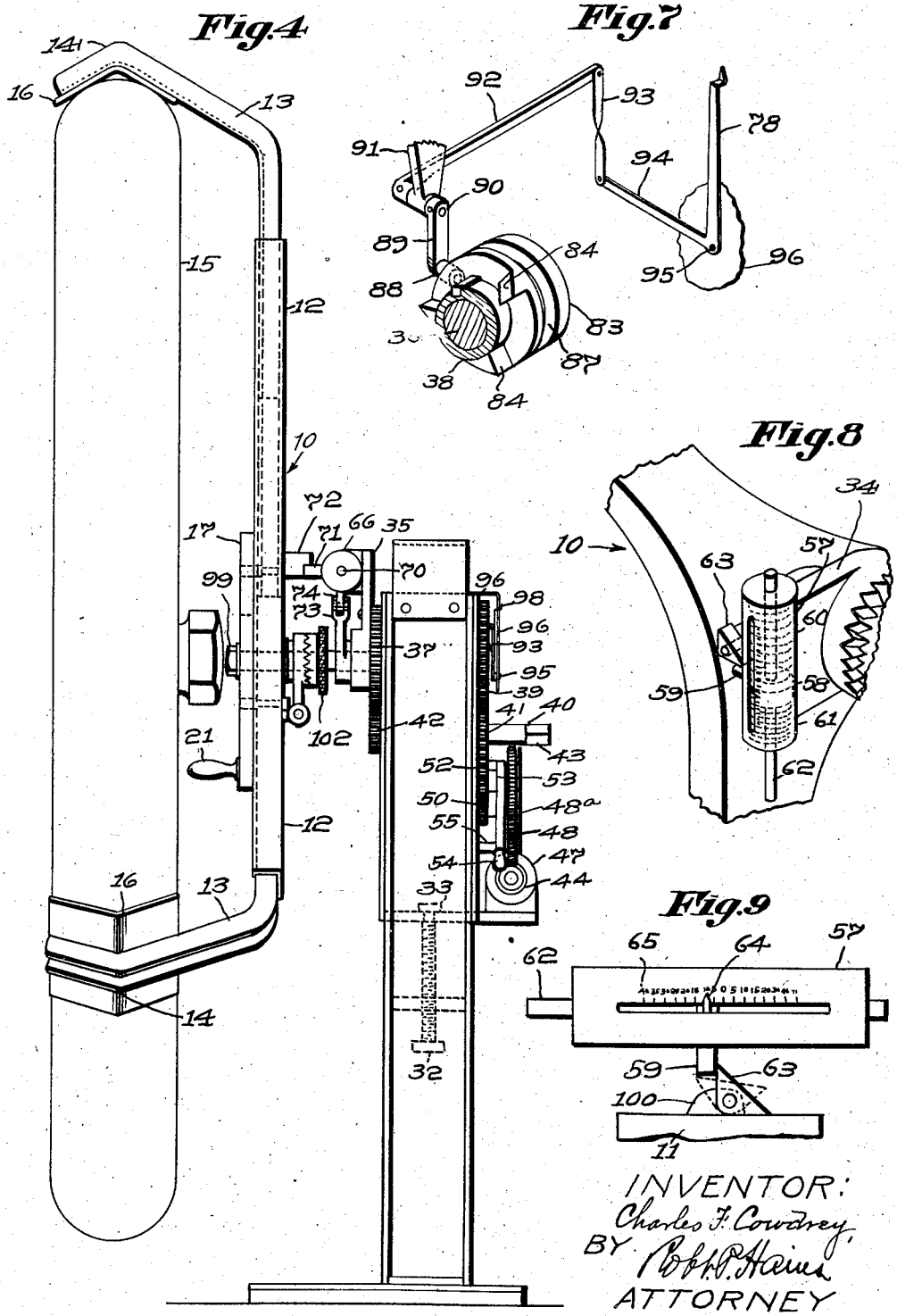

Jan. 5, 1926. 1,568,801
C. F. COWDREY
BRAKE TESTING DEVICE FOR AUTOMOBILES
Filed Dec. 15, 1923 3 Sheets-Sheet 3
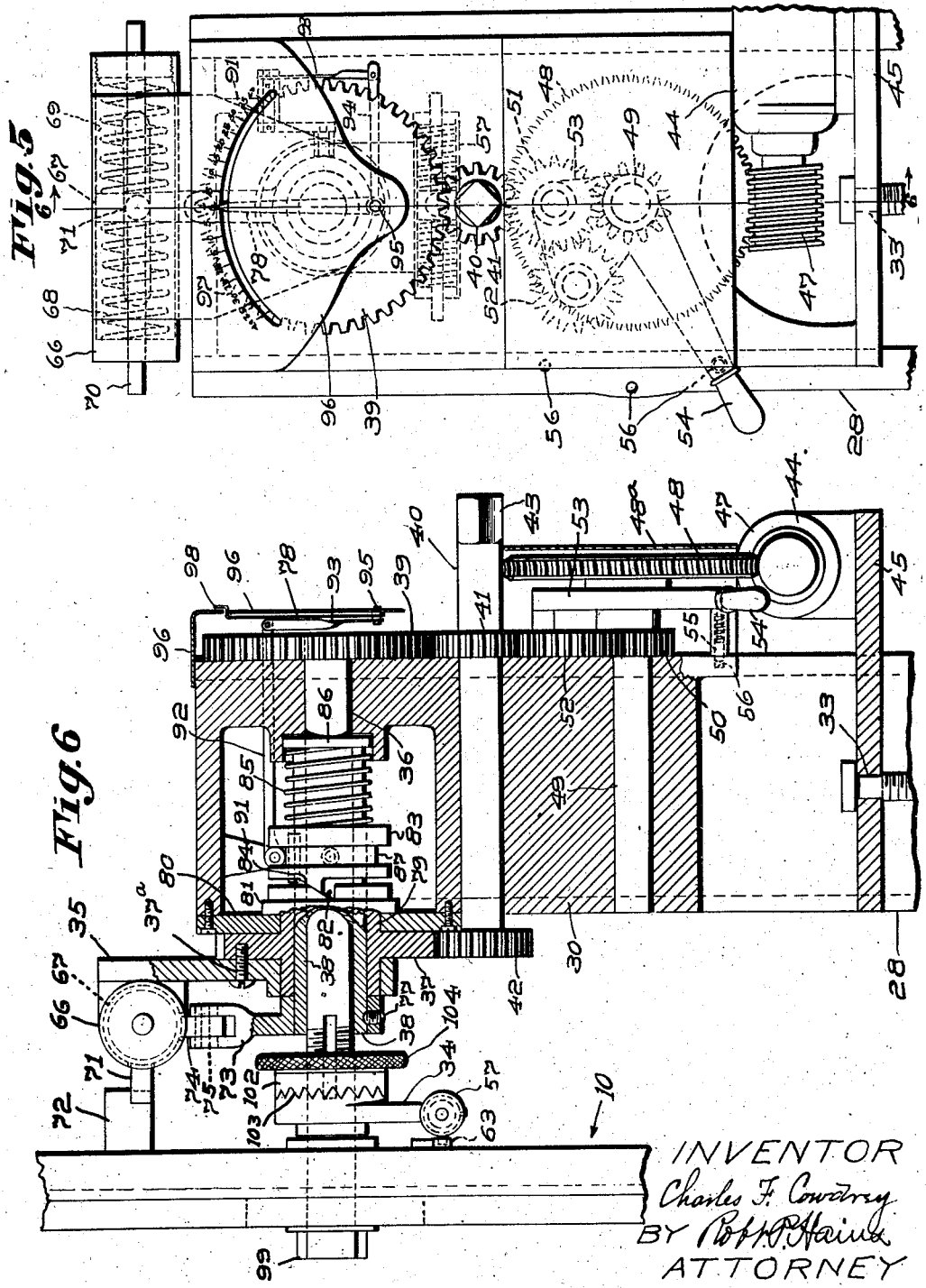

Patented Jan. 5, 1926.

1,568,801

UNITED STATES PATENT OFFICE.

CHARLES F. COWDREY, OF FITCHBURG, MASSACHUSETTS.

BRAKE-TESTING DEVICE FOR AUTOMOBILES.

Application filed December 15, 1923. Serial No. 680,962.

*To all whom it may concern:*

Be it known that I, CHARLES F. COWDREY, a citizen of the United States, residing in Fitchburg, county of Worcester, and State of Massachusetts, have invented an Improvement in Brake-Testing Devices for Automobiles, of which the following description, in connection with the accompanying drawings, is a specification, like characters on the drawings representing like parts.

This invention relates to means for testing the action of the brakes upon the wheels of an automobile or other vehicle.

It is important that the brakes of an automobile act upon the rear wheels with equal or substantially equal braking effect, for if the brakes act with greater force upon one rear wheel than the other, the movement of the automobile upon application of the brakes is liable to cause the automobile itself to swerve from its direct path of movement with disastrous effect, due to the unequal retarding effect the wheels exert upon the opposite sides of the automobile. Aside from the fact that improperly adjusted brakes are likely to cause an automobile to swerve from its direct path of travel, an automobile cannot be brought to rest promptly unless the brakes are adjusted properly.

Furthermore when brakes are provided upon the front wheels of an automobile as well as upon the rear wheels the problem of maintaining the brakes properly adjusted becomes of still greater importance, for if the brakes upon the front wheels act with greater force than the brakes upon the rear wheels, the greater retarding effect upon the front part of the automobile may cause the automobile to turn somersault with disastrous results.

Heretofore it has been proposed to place a lever or other operating means in engagement with the rear wheel of an automobile to rotate the wheel through a small angle while the brake is applied, and an indicator has been associated with the wheel turning means to indicate the pressure exerted to turn the wheel.

This proposed construction serves to indicate the force required to impart an initial rotative movement to the wheel; that is, the force required to start the wheel rotating when the brake is applied, but does not indicate the true action of the brake upon a rotating wheel. In other words the construction proposed heretofore will serve to indicate the force required to start a wheel rotating from a standing position, and this information is desirable as showing the force required to start an automobile moving from a standing position, when the brakes are applied; but, it is more important to determine the retarding effect exerted by a brake upon a wheel while the wheel is rotating. This is the braking action that serves to slow down an automobile or to bring it to rest and this information can not be determined with the brake testing mechanism heretofore proposed.

An important feature of the present invention, therefore, resides in a brake testing device which will indicate the retarding action of a brake upon a rotating wheel.

Another important feature of the invention resides in a brake testing device which will indicate the force required to start a wheel rotating under brake resistance, and which will also indicate the force required to keep the wheel rotating under brake resistance. The former brake action may be conveniently described as the "static" brake action and the latter as the "dynamic" brake action, and the present invention contemplates means for testing both the static and dynamic brake action, or either the static or dynamic brake action.

Other features of the invention and novel combination of parts in addition to the above will be hereinafter described in connection with the accompanying drawings which illustrate one good practical form thereof.

In the drawings:

Fig. 1 is a perspective view of a wheel of an automobile having the device of the present invention associated therewith.

Fig. 2 is a rear face view of a portion of the tire-gripping device of Fig. 1.

Fig. 3 is an enlarged sectional view, taken on the line 3—3 of Fig. 2.

Fig. 4 is a side view of the construction shown in Fig. 1.

Fig. 5 is an enlarged front view of the upper portion of the brake-testing device of Fig. 4.

Fig. 6 is a sectional view taken substantially on the line 6—6 of Fig. 5.

Fig. 7 is a perspective view of the levers which operate the indicator pointer.

Fig. 8 is an enlarged view of a portion of the tire-gripping device and an associated operating arm; and Fig. 9 is a front view of parts shown in Fig. 8.

In carrying out the present invention it is desirable to provide means for imparting continuous rotative movement to a wheel of an automobile or other vehicle, the brake action of which is to be tested, and it is desirable that mechanism be provided for rotating the wheel to be tested through one or more complete turns under brake action, so that the force required to maintain the wheel in rotation may be determined. The mechanism for carrying out this object may be variously constructed and the means by which this rotative movement may be imparted to the wheel may be given various embodiments.

In the embodiment of the invention illustrated, a tire-gripping device or head 10 is provided, which is adapted to be secured to and removed from the wheel which is to be rotated in order to determine the action of the brake associated with the wheel. The tire-gripping device or head 10 is shown as provided with a central hub 11 having three outwardly extending arms 12, and each of these arms is provided with a tire-gripping element 13 having an inwardly extending shank which is slidably mounted in its arm 12, the arrangement being such that the elements 13 may be slid length-wise within the arms 12, to move the outer ends of these elements into tire-gripping position. Each element 13 is provided at its out end with a laterally extending portion 14 that has the flattened V-construction shown, which extends over the tread of the tire 15, and if desired a plate 16 may be secured to the inner face of the portion 14 to contact with the automobile tire.

It is desirable that means be provided for sliding the elements 13 lengthwise of the arms 12 simultaneously, and that the same amount of movement be imparted to each element 13, so that the tire-gripping device 10 will be secured to the wheel with its axis aligned with the axis of the wheel. Means for imparting this adjustment to the elements 13 may be variously constructed, and in the construction shown a disc 17 is provided as rotatably mounted upon the inner face of the hub 11, and this disc is provided with three eccentrically disposed slots 18. Links 19 are provided for imparting movement from the disc 17 to the sliding elements 13 and the outer ends of the links 19 are secured to the elements 13 while the inner ends of these links are provided with pins 20 that extend into the eccentric slots 18. The disc 17 is provided with a handle 21 which may be engaged to rotate the disc upon the hub 11, the arrangement being such that when the disc is rotated in one direction the eccentric slots 18 will force the pins 20, and links to which these pins are secured, inwardly to pull the elements 13 towards the axis of the wheel with tire-gripping effect, and when the disc 17 is rotated in the opposite direction the links 19 will be forced outwardly to move the elements 13 out of the tire-gripping position, so that the tire-gripping device 10 may be removed from the wheel. It is desirable to construct the tire-gripping device so that it may be applied to wheels of different diameter, and this is readily accomplished by providing the outer end of each link 19 with a pin 22 adapted to be inserted in any one of several holes 23 formed in the shank portion of the element 13. The pin 22 may be held in the desired hole 23 by a flat spring 24 secured to the link 19 at 25. The tire-gripping device just described may be easily applied to and removed from the wheel to be tested, and forms a satisfactory means for imparting rotative movement to the wheel, but it is to be understood that various other devices may be employed to this end.

The present invention contemplates one form of means for imparting an initial rotative movement to a wheel, the brake action of which is to be tested, and of a different means for imparting a continuous rotative movement to the wheel under brake-resistance after the initial rotative movement has been imparted to the wheel. This is desirable in order that the force may be determined that is required to start the wheel rotating under brake resistance, and that the different force required to keep the wheel rotating under brake resistance may also be determined. However, in many cases it may not be desirable to indicate both of these forces, in which case a single rotative movement may be employed to start the wheel to be tested rotating, and for keeping the same rotating during the brake testing operation.

In the embodiment of the invention illustrated an up-standing column 26 is provided having a base 27 adapted to rest on the ground or the floor of a building. The column 26 is shown as consisting of a pair of spaced uprights 28 connected by one or more transversely extending bars 29 and a sliding block 30 is provided between the upper portion of the spaced arms 28. The various operating elements to be described are mounted upon the block 30, and since different sized wheels support their axes different distances from the ground, it is desirable to provide means for raising and lowering the block 30 to bring the wheel-driving means upon this block in axial-alignment with the axis of the automobile wheel. This is readily accomplished by providing an adjusting screw 31 which has threaded engagement with the bar 29, and this screw may be rotated by a hand wheel 32, and the upper end of the screw 31 is connected to the lower end of the block 30 as at 33 (Fig. 5).

In the embodiment of the invention illustrated, one arm 34 is provided for imparting the initial movement to the wheel of the automobile, and a second arm 35 is provided for keeping the wheel rotating after the initial movement has been imparted to the wheel by the arm 34. In accomplishing this, means is provided for rotating the arm 35 faster than the arm 34, so that after the wheel has started, rotating under the action of the arm 34, the arm 35, due to its faster movement, will impart its movement to the wheel and relieve the arm 34. To this end, in the construction shown, the arm 34 is mounted upon a central shaft 36, which is journaled in the block 30, and the faster arm 35 is rigidly secured to a gear 37, by one or more bolts 37ª. The gear 37 is rotatably mounted upon a hollow shaft 38. One end of the central shaft 36 is provided with a driving gear 39, and since the arm driven by the shaft 36 rotates at a lower speed than the arm 35, the gear 39 is slightly larger in diameter than the gear 37, and these two gears may be driven from a shaft 40. The shaft 40 is provided with a pinion 41 which meshes with the gear 39, and with a slightly larger pinion 42 which meshes with the gear 37. The shaft 40, if desired, may be rotated by hand by placing a crank handle or other rotating means upon the outer squared end 43 of this shaft. In most cases however it will be more satisfactory to provide power-operated means for rotating the shaft 40, and this may be accomplished by means of a small electric motor 44, mounted on a base plate 45, extending outwardly from the lower portion of the block 30. The central shaft 46 of the motor 44 is provided with a worm 47 which meshes with a worm wheel 48, mounted upon the shaft 49, which shaft is supported by the block 30. A protecting plate 48ª preferably is supported in front of the worm wheel 48.

For reasons to be hereinafter pointed out, it may be desirable to rotate the wheel-driving means in either a right-hand or left-hand direction and means for reversing the rotative movement imparted to the shaft 40 is therefore provided. To this end the gear 48 has rigidly secured thereto a pinion 50 which drives a gear 51, and the gear 51 is maintained in driving engagement with a second gear 52. The gears 51 and 52 are carried by a rocking bracket 53, which bracket may be swung to different positions by an operating lever 54. The arrangement is such that when the bracket 53 is moved to the position shown in Fig. 5 the gear 51 will mesh with the pinion 41 and will rotate the shaft 40 in one direction, and if the bracket 53 is rocked in a clockwise direction viewing Fig. 5, the gear 52 will be brought in mesh with the pinion 41 and the shaft 40 will be rotated in the opposite direction. A spring-operated pin 55 mounted upon the hand-operated lever 54 is adapted to engage in one of three different holes 56 formed in the block 30, the arrangement being such that the bracket 53 may be secured by the pin 55 in the position shown in Fig. 5, or it may be secured in a second position, in which the gear 52 is meshed with the pinion 41, or the bracket may be secured in an intermediate position in which both gears are out of mesh with the pinion 41 whereupon the shaft 40 may be rotated by hand.

From the construction so far described it will be seen that the central shaft 36 and the arm 34 mounted upon this shaft may be rotated in either direction by the electric motor 44, and that this arm serves to impart an initial rotative movement to the tire-gripping device 10. It is desirable to avoid subjecting the operating mechanism to a severe shock or strain when the rotating force is first applied to the wheel, and to this end the outer end of the arm 34 is provided with a cylinder casing 57 in which is slidably mounted a piston 58 having an outwardly extending pin 59, and a coiled spring 60 is mounted within the cylinder 57 between the piston 58 and one end of the cylinder, while a second spring 61 is mounted between the opposite end of the cylinder and the piston 58. the construction being such that the piston 59 may yield in one direction or the other by compressing one of the coiled springs. The piston 58 may be guided in its sliding movement by a central shaft 62 extending slidably through holes in the opposite ends of the cylinder, and the laterally extending pin 59 is positioned to engage a lug 63 mounted upon the tire-gripping device 10. As a result of the construction just described the arm 34 is rotated by its operating shaft 36 until the pin 59 is carried by the arm into engagement with the lug 63, and as the arm 34 continues to rotate, one of the springs 60—61 will be compressed until sufficient force is exerted by the spring to start the wheel being tested rotating under brake resistance. The force required to start the wheel rotating may readily be indicated by providing the piston 58 with a pointer 64 (see Fig. 9) which cooperates with a scale 65 formed upon the outer face of the cylinder 57.

As stated the present device is adapted to indicate not only the static brake action, that is the force required to start the wheel rotating under brake resistance, but serves also to indicate the dynamic brake action or force required to keep the wheel rotating under brake action, and the determination of the dynamic brake action in most cases will be the more important of the two. Means is therefore provided for indicating the dynamic brake action throughout the entire testing operation, and one satisfactory form of mechanism for accomplishing this will now be described.

The arm 35 which is driven by the gear 37, and which is rotated at a faster speed than the arm 34, is provided with a cylinder casing 66, which may be similar to the casing 57 above mentioned, and in this casing is mounted a sliding piston 67 which is urged in one direction by a spring 68 confined between the piston and one end of the cylinder, and is urged in an opposite direction by a spring 69 confined between the piston and the opposite end of the cylinder, and the piston 67 may be secured to a sliding shaft 70 extending through the ends of the piston casing 66. The cylinder is provided with a laterally extending pin 71 which is adapted to be moved into operative engagement with a lug 72 rigidly mounted upon a front face of the tire-gripping device 10. As the arm 35 rotates it will move the pin 71 into engagement with the lug 72 and as the arm 35 continues to rotate one of the springs 68—69 will be compressed until it exerts sufficient force upon the piston 67 to rotate the automobile wheel under brake resistance. The amount the spring within the casing 66 is compressed will indicate the force required to keep the wheel rotating under brake resistance, and it is desirable to provide the present device with an indicator pointer located so that it may be easily read during the testing operation, and which indicator will show the force being exerted at any instant throughout the brake testing operation to rotate the wheel under brake resistance.

The means herein provided for operating such pointer in accordance with the compression of one of the springs 68 and 69 will now be described. Adjacent the arm 35 is mounted a second arm 73 which is free to rotate relative to the arm 35 and a connection is provided between the outer end of the arm 73 and a lug 74 extending outwardly from the piston 67, the arrangement being such that as the piston 67 is moved lengthwise of its casing it will rotate the arm 73 relative to the arm 35, due to a connection between the outer end of the arm 73 and the lug 74, which connection may consist of a pin 75 engaging an elongated slot in the outer end of the arm 73. The arm 73 is mounted upon and is rigidly secured to the long sleeve or shaft 38 and the rigid connection between this arm and sleeve may consist of a screw 77. From the mechanism just described it will be seen that movement of the piston 67 lengthwise of its casing will impart a rotative movement to the sleeve 38 relative to the gear 37, and in order to utilize this relative movement to operate a pointer, that may be located at the front of the testing device as at 78, the following mechanism is provided:—The gear 37 is provided with a sleeve 79 which extends through a wall 80 of the supporting block 30, and the inner end of this sleeve is provided with an enlarged portion 81 having one or more notches 82 formed in its inner face, and a collar 83 slidably mounted upon the long sleeve 38 is provided with one or more outwardly extending teeth 84 which correspond in number to the notches 82, and the collar 83 is keyed to the long sleeve 38 so that the angular movement of this sleeve relative to the gear 37 will be imparted to the collar 83, with the result that the teeth 84 of this collar will slide in one direction or the other along the inclined surface of the notches 82. The collar 83 is urged in a left-hand direction, viewing Fig. 6, by a coiled spring 85, which is confined between the collar 83 and a flange 86 at the inner end of the long sleeve 38. As a result of the construction just described, the inclined face of the teeth 84 are held in engagement with the inclined face of the notches 82 by the spring 85, but it will be apparent that the collar 83 will not move lengthwise of the long sleeve 38 unless the collar 83 is permitted to rotate relatively to the gear 37, and this rotative movement is controlled by the angular movement of the arm 73 relatively to the arm 35. Any movement of the collar 83 lengthwise of the sleeve 38 serves to actuate the pointer 78 and to this end the collar 83 is provided with an annular slot 87 adapted to receive a roller 88 mounted on an arm 89 (see Fig. 7) secured to a shaft 90. The shaft 90 is journaled in a bracket 91 projecting downwardly from a wall of the block 30 and has a relatively long arm 92 rigidly secured thereto, and rocking movement of this arm is imparted to the pointer 78 by a link 93, which is connected to a laterally extending arm 94 rigidly secured to the pointer 78. The pointer 78 is pivotally secured by a pin 95 to the face plate 96 which is secured to the front portion of the block 30 and extends downwardly over the gear 39 to form a protecting casing for the same. The plate 96 is provided with an arc-shaped slot 97 through which the outer end 98 of the pointer extends, and which pointer swings over a graduated dial adjacent the slot 97.

In testing the wheels of an automobile or other vehicle with the present device, it is necessary to reverse the direction of rotation of the operating arms 34 and 35 when the testing device is removed from a wheel upon one side of the vehicle and applied to a wheel upon the opposite side of the vehicle. This necessitates the construction above described by which the pistons 58 and 67 will move yieldingly in opposite directions. The mechanism just described for imparting movement from the lever 73 to the indicator 78 should be so adjusted that when the piston 67 is in its intermediate or normal position, as shown in Fig. 5, the indicator 78 will occupy a corresponding central position, as shown in Fig. 5. With this adjustment, when the arm 35 is rotated in one direction and one spring is compressed, the indicator will swing from its central position in a right-hand direction, and when the arm 35 is rotated in the opposite direction and the other spring is compressed, the indicator will move in the left-hand direction from its central position.

It is desirable to provide means for removably connecting the tire-gripping device 10 to the operating mechanism supported by the upright 26 and in the construction shown the hub 11 of the tire-gripping device is provided with a central bore adapted to receive an end of the shaft 36 so that the tire-gripping device may be rotatably mounted upon this shaft. In using the present testing device it may be found desirable to secure the tire-gripping device 10 to an automobile wheel and then place the wheel rotating means supported by the stand 26 in its operative position adjacent the wheel. The present construction therefore preferably is such that the tire-gripping device may be readily placed upon or removed from the shaft 36 and it may be held in place upon this shaft by a nut 99, and when the tire-gripping device is mounted upon the shaft 36, as shown in Fig. 4 and Fig. 6, one lug 72 upon the tire-gripping device will be in position to be engaged by the pin 71 carried by the fast arm 35, while the lug 63 will be in position to be engaged by the pin 59 upon the slow arm 34.

As stated, in the construction shown, initial rotative movement is imparted to the tire-gripping device and wheel by the arm 34, and after the wheel has been placed in motion the fast arm 35 serves to continue the rotative movement of the wheel. Since the arm 35 travels faster than the arm 34, the pin 59 will engage the lug 63 while initial rotative movement is being imparted to the wheel, but when the fast arm 35 starts rotating the wheel, the lug 63 will gradually move away from the pin 59, due to the fact that the wheel is now traveling at a faster speed than the arm 34. It is therefore necessary to provide means by which the pin 59 may pass the lug 63 as the lug approaches the opposite side of the pin 5 upon the tire-gripping device, having made one complete revolution relative to the arm 34. To this end the lug 63 is pivotally mounted upon the tire-gripping device by a bracket 100, so that the lug 63 may rock to the position shown in dotted lines in Fig. 9, as this lug passes the pin 59.

In testing the action of a foot brake upon the wheels of an automobile, the foot brake treadle preferably is forced downwardly with a predetermined pressure, say 40 lbs., and should be maintained in the same depressed position during the testing of the wheels upon the opposite side of the automobile. Various means may be provided for holding the brake treadle depressed a desired amount throughout the operation of testing the brakes, and one satisfactory means for maintaining the foot treadle depressed is shown, described and claimed in my Patent No. 1,440,970, granted January 2, 1923. During the operation of testing the action of a brake upon a wheel, the wheel being tested is preferably supported clear of the ground by an ordinary jack 101. The tire-gripping device 10 is placed upon the wheel and is readily secured thereto by rotating the disc 17 in a direction to force the tire engaging elements into firm gripping engagement with the tire as above described. Before applying propelling force to the tire-gripping device 10 the slow arm 34 should be brought into operative engagement with the lug 63 and the fast arm 35 should be angularly disposed a substantial distance from lug 72, so that when power is applied to rotate the wheel, the slow arm 34 will have an opportunity to start the wheel rotating before the faster arm 35 comes into operative engagement with lug 72. In order that the arms 34 and 35 may occupy the proper position relative to their respective lugs the slow arm 34 is rotatably mounted upon its shaft 36 and may be clamped thereupon in various different positions of angular adjustment. To this end the sleeve 102 is slidably mounted upon the shaft 36 and is keyed thereto to prevent the same from rotating upon the shaft, and this sleeve has a number of teeth 103 that may be moved into and out of gripping engagement with corresponding teeth upon the arm 34. A nut 104 having threaded engagement with the shaft 36 serves to clamp the sleeve 102 in driving engagement with the shaft-engaging portion of the arm 34.

From the above description, when read in connection with the drawings, it will be seen that the fast arm 35 will serve to impart a continuous rotative movement to a wheel for as long a period as desired, and that the construction described will serve to rotate the wheel under brake resistance and will indicate the force required to turn the wheel under such brake resistance. During the brake-testing operation the force exerted to turn the wheel will compress one of the springs within the casing 67 and the extent such spring is compressed will be shown by a corresponding movement of the pointer 78 over the face of its dial. Should the brake band act with different force upon different portions of the brake drum this will be indicated by a movement of the indicator during one complete rotation of the wheel. After the action of a brake upon a wheel at one side of an automobile has been tested and the reading of the indicator noted, the corresponding wheel upon the opposite side of the automobile is then tested under the same depression of the brake treadle, and if the brakes are properly adjusted the readings taken upon each pair of wheels will be the same, and if the readings are not the same or approximately so, obviously the brakes require adjustment.

From the foregoing it will be seen that the present brake-testing device will serve accurately to indicate the action of a brake upon each wheel of an automobile during the continued rotation of the wheel, and that the action of the brakes of an automobile under actual operative condition may be accurately determined by the present brake-testing device.

What is claimed is:—

1. A brake tester for testing the action of a brake upon a wheel of an automobile, comprising in combination, means for imparting an initial rotative movement to a wheel, separate means for continuing the rotation of the wheel while the brake is applied, mechanism common to both means for driving them and means for indicating the force required to maintain the rotative movement of the wheel under brake resistance.

2. A brake tester for testing the action of a brake upon a wheel of an automobile, comprising in combination, means for imparting an initial rotative movement to a wheel under brake resistance and provided with mechanism for indicating the force required to start the wheel rotating, separate means operable in timed relation to the first means for continuing the rotation of the wheel under brake resistance, and an indicator for indicating the force required to keep the wheel rotating under brake resistance.

3. A brake tester for testing the action of a brake upon a wheel of an automobile comprising in combination, an upstanding column, means supported upon said column to impart an initial rotative movement to a wheel of an automobile, different means supported by said column and operable to continue the rotation of the wheel under brake resistance, and means for indicating the force required to keep the wheel rotating under brake resistance.

4. A brake tester for testing the action of a brake upon a wheel of an automobile, comprising in combination, a supporting frame, an arm rotatably supported by the frame, means for rotating said arm through a complete circle, a connection between the arm and a wheel of an automobile for rotating the wheel under brake resistance, a spring associated with the arm to be tensioned by the force exerted to rotate the wheel under brake resistance, and an indicator operable in response to the compression of said spring to indicate the force exerted to rotate the wheel.

5. A brake tester for testing the action of a brake upon a wheel of an automobile, comprising in combination, a supporting frame provided with a rotating arm, means for rotating said arm through a complete circle, a connection between the arm and the wheel of an automobile for rotating the wheel under brake resistance, a second arm rotatable about the axis of the first arm and yieldingly connected to the first arm to be moved angularly relative to the first arm by variations in the force exerted to turn the wheel, and an indicator actuated by the relative angular movement of said arm to indicate the force exerted to rotate the wheel under brake resistance.

6. A brake tester for testing the action of a brake upon a wheel of an automobile, comprising in combination, a frame provided with a rotating arm, means for rotating the arm through a complete circle, a yielding connection between the arm and the wheel of an automobile for rotating the wheel under brake resistance, and means for moving an indicator over a fixed dial in response to the yield of said connection to indicate the force required to rotate the wheel.

7. A brake tester for testing the action of a brake upon a wheel of an automobile, comprising in combination, a head constructed to be secured to an automobile wheel to turn it, driving means for said head including a supporting frame, a pair of drivers for the head rotatably supported by the frame, means for operating one driver to initiate rotation of the wheel under brake resistance, means for operating the second driver to rotate the wheel after it has been started by the first driver, and an indicator for indicating the force exerted to keep the wheel rotating under brake resistance.

8. A brake tester for testing the action of a brake upon a wheel of an automobile, comprising in combination, a supporting frame, a pair of drivers supported by the frame for rotating an automobile wheel under brake resistance, means for imparting the movement of one of said drivers to an automobile wheel to initiate rotation of the wheel, means for imparting the movement of the other driver to the wheel to rotate the wheel after it has been started by the first driver, and an indicator for indicating the force exerted to keep the wheel rotating under brake resistance.

In testimony whereof, I have signed my name to this specification.

CHARLES F. COWDREY.